United States Patent Office 3,634,502
Patented Jan. 11, 1972

3,634,502
PREPARATION OF UNSATURATED ALDEHYDES AND ACIDS
Jamal S. Eden, Akron, Ohio, assignor to The B. F. Goodrich Company, New York, N.Y.
No Drawing. Filed July 1, 1969, Ser. No. 838,349
Int. Cl. C07c 57/04
U.S. Cl. 260—533 N    7 Claims

ABSTRACT OF THE DISCLOSURE

Unsaturated aldehydes and acids as acrolein and acrylic acid or methacrolein and methacrylic acid are prepared in excellent yields and at improved rates by the oxidation of propylene or isobutylene in the presence of a versatile catalyst containing molybdenum oxide, tellurium oxide and a boron phosphate. Calcination of the boron phosphate alone or in the catalyst mixture above 450° C. favors formation of aldehydes.

BACKGROUND OF THE INVENTION

Processes for preparing mixtures of unsaturated aldehydes and unsaturated carboxylic acids by oxidation of olefins at elevated temperatures over a catalyst are known. Catalysts for such processes contain for example, molybdenum oxide, tellurium oxide and heavy metal phosphates, as well as catalysts containing certain heavy metal molybdates, tellurium oxide and phosphorus oxide. It is desirable to have processes for the preparation of the unsaturated aldehydes and acids wherein the ratio of aldehyde to acid obtained may be varied. While with some catalysts this may be done to some extent by varying reaction conditions, it is desirable to have other methods.

SUMMARY OF THE INVENTION

When olefins such as propylene or isobutylene are reacted with oxygen at an elevated temperature in the presence of a novel catalyst initially containing molybdenum oxide, tellurium oxide and boron phosphate, excellent conversion and yield of propylene to acrolein and acrylic acid are obtained. It has also been found, quite unexpectedly, that if there is used in the process a catalyst wherein the borophosphate, alone or in the catalyst mixture, is calcined at a temperature above 450° C., formation of aldehyde is favored.

DETAILED DESCRIPTION

The reactants for providing aldehydes and acids are propylene or isobutylene, a molecular oxygen-containing gas which can be pure oxygen, oxygen diluted with an inert gas, oxygen enriched air or air per se.

Stoichiometric ratios of oxygen to olefin for the purposes of this invention are 1.5:1. While lower ratios of oxygen can be used at a sacrifice of yield, it is preferred to use an excess of oxygen. Large excesses of oxygen while not undesirable, introduce process problems particularly if air is the source of the oxygen. An amount of oxygen from about 2 to about 6 mols of oxygen per mol of olefin is an adequate range.

The use of steam in the reaction while desirable is not absolutely essential. The amount of steam used may be varied from about 0 to 10 or more mols per mol of olefin. Other diluent gases such as nitrogen, saturated hydrocarbons such as propane may be used.

The reaction may be carried out in either fixed or fluidized catalyst bed.

The reaction temperature can range from about 300° C. to about 550° C. A preferred range is from about 350° C. to about 450° C.

The contact time may vary considerably in the range of greater than 0.1 seconds. Good results have been obtained within the range of about 6 to about 60 seconds. While advantage may be taken of the short contact time, longer times may be used if desired.

The reaction may be conducted at atmospheric pressure, in a partial vacuum, or under induced pressures up to 100 p.s.i. or higher. Atmospheric pressure is preferred for fixed bed systems and higher pressures for fluid bed reactions.

The particle size of the catalyst for fixed bed operations may be from about 10 to 18 mesh. Larger and smaller size particles may be used in fixed beds if desired. For fluid bed operations, catalyst size normally will range from about 80 to 325 mesh (U.S. Sieve).

The active catalyst containing molybdenum oxide, tellurium oxide and the boron phosphate may be prepared by a number of methods and may be supported or unsupported. The catalyst ingredients may be mixed in the form of solutions or slurries, or can be dry blended. Supported catalysts may be prepared by adding a dry support or aqueous slurry thereof to the catalyst ingredients. Among suitable supports are silica, silica-containing alumina, titania, zirconia, materials such as diatomaceous earth, kieselguhr, pumice, silicon carbide, clay, alumina, aluminum phosphate and the like.

The catalyst used in accordance with the improved process of this invention may be prepared from solutions or slurries of the necessary ingredients or precursors thereof. The variable relating to ratios of aldehyde and acid obtained is in part relatable to the treatment given to the boron phosphate, either alone or in admixture with the other necessary catalyst ingredients. When the boron phosphate is calcined at temperatures of about 450° C., or below, either alone, or in admixture with the other catalyst ingredients and the mixture calcined at temperatures below about 450° C., substantial proportions of acrylic acid in relation to acrolein may be obtained under proper reaction conditions. However, and this is quite unexpected, it was found that when the boron phosphate is calcined above 450° C., preferably above 475° C., either before admixture with the other catalyst ingredients, or the mixture of catalyst ingredients including the boron phosphate is calcined above 450° C., as about 500° C., under equivalent reaction conditions a very high ratio of unsaturated aldehyde to unsaturated acid is obtained. Thus, under process conditions where aldehyde is desired without extreme variation in operating conditions, one may obtain high yields of acrolein and smaller yields of acrylic acid with catalysts so prepared; and conversely, when increased yields of acrylic acid are desired; catalysts prepared with the boron phosphate calcined at temperatures below about 450° C. may be employed. Thus, a versatile catalyst and process is provided in accordance with this invention whereby ratios of unsaturated aldehydes and acids are suitably varied by calcination at varying temperatures, as between about 400–550° C. Calcination for 8–16 hours is satisfactory.

The molar ratio of catalyst constituents is about 1–10 mols of molybdenum oxide, 1–10 mols of tellurium oxide and 1–10 mols of boron phosphate. Good results are obtained, for example, with ratios of about 100 $MoO_3$, 15 to 50 $TeO_2$ and 25 to 100 $BPO_4$.

Examples

Runs were made in a fixed bed reactor of a high silica (Vycor) glass tube 12" long and 30 mm. outer diameter. The reactor had inlets for air, steam and propylene. External electrically operated heating coils were wound on the reactor. Outlet vapors were passed through a water cooled condenser and the uncondensed gases were passed through a gas chromatograph and analyzed continuously. The liquid condensate was weighed and analyzed for unsaturated acid and aldehyde in the gas chromatograph.

A catalyst was prepared by first preparing the boron phosphate. 123 grams (2 mols) of boric acid dissolved in warm water at 60° C. was mixed with 231 grams (2 mols) of 85% $H_3PO_4$. The resulting mixture was evaporated to dryness on a steam bath and calcined in a hot tube oven for 16 hours at 400° C. 203.29 grams (1.2 mols $MoO_3$) of molybdic acid slurried in water at a concentration of 85% was added to 84.64 grams (0.8 mol) of the calcined $BPO_4$ slurried in water, and 63.84 grams (0.4 mol) of $TeO_2$ slurried in water was added to this mixture. The mixture formed was then evaporated to dryness on a steam bath and calcined in a hot tube oven for 16 hours at 400° C., 16 hours at 450° C., and for 5 hours at 500° C. The resulting catalyst contained a molar ratio of 75 molybdenum oxide, 25 tellurium oxide and 50 boron phosphate. The catalyst was ground to 10–18 mesh. 80 ml. of catalyst was placed in the reactor.

Steam at a temperature of 200 to 250° C. was first fed into the reactor, and thereafter propylene and air were separately fed into the reactor from preheaters at a temperature of about 200 to 250° C. Before the propylene was added, the reactor was preheated to about 285° C. The molar ratio of reactants used, mols of oxygen and water per mol of olefin, oxygen (as air), the reaction temperature, contact time (calculated at room temperature and pressure), conversion and yield in the several runs are set forth in the table in Runs 1–7.

a catalyst said olefin and oxygen in a ratio of about one mol of said olefin and greater than 1 mol of oxygen at a temperature from about 300° C. to about 500° C., said catalyst consisting essentially of as essential ingredients on a molar basis, a mixture of 1–10 molybdenum oxide, 1–10 tellurium oxide and 1–10 boron phosphate.

2. The method of claim 1 wherein the olefin is propylene, the molar ratio of oxygen is from between about 2 and 5, the reaction temperature is about 350° C. to about 450° C. and there is present from 0 to 10 mols of steam per mol of propylene.

3. The method of claim 2 where the catalyst molar ratio is 1:0.1–1:0.1–2.

4. The method of claim 1 wherein the olefin is isobutylene, the molar ratio of oxygen is between about 2 to 5, the reaction temperature is about 350 to about 450° C. and there is present from 0 to 10 mols of steam per mol of isobutylene.

5. The method of claim 4 wherein the catalyst molar ratio is 1:0.1–1:0.1–2.

6. A method of claim 1 wherein the boron phosphate has been heated at a temperature below about 450° C.

7. A method of claim 1 wherein the boron phosphate has been heated at a temperature above 450° C.

DATA TABLE

| Run | Temp. (° C.) | Contact time, seconds | Oxygen, mols | Water, mols | Mol percent propylene conv. | Mol percent yield on propylene conv. | |
|---|---|---|---|---|---|---|---|
| | | | | | | Acrolein | A. acid |
| 1 | 385 | 28.5 | 3.04 | 3.75 | 85.9 | 88.66 | 6.81 |
| 2 | 375 | 28.5 | 3.02 | 5.3 | 86.2 | 87.74 | 6.41 |
| 3 | 395 | 28.5 | 3.02 | 5.3 | 94.6 | 73.36 | 14.35 |
| 4 | 400 | 28.5 | 3.02 | 5.3 | 94.3 | 73.48 | 15.20 |
| 5 | 395 | 23.0 | 4.02 | 8.96 | 97.5 | 76.30 | 14.01 |
| 6 | 385 | 19.0 | 5.0 | 5.3 | 88.8 | 89.43 | 9.22 |
| 7 | 415 | 19.0 | 5.0 | 5.3 | 92.7 | 75.66 | 14.39 |
| 8 | 405 | 49.0 | 4.02 | 3.96 | 100 | 35.06 | 42.57 |
| 9 | 400 | 49.0 | 4.02 | 3.96 | 100 | 49.82 | 31.80 |

When the catalyst described in Example I was prepared in the same manner again with the difference that the catalyst was calcined no higher than 450° C., increased yields of acrylic acid are noted at temperatures in the range of about 400° C. as demonstrated in Runs 8 and 9 in the data table.

I claim:

1. The method for preparing unsaturated monoolefinic aldehydes and acids by gas phase oxidation of a methyl group of a hydrocarbon selected from the group consisting of propylene or isobutylene comprising passing over

References Cited

FOREIGN PATENTS 720,830 11/1965 Canada _____ 260—533 N
839,808 6/1960 United Kingdom __ 260—533 N LORRAINE A. WEINBERGER, Primary Examiner R. D. KELLY, Assistant Examiner U.S. Cl. X.R.

252—432; 260—604 R